(12) United States Patent
Schnell et al.

(10) Patent No.: US 11,665,491 B2
(45) Date of Patent: May 30, 2023

(54) FACE MASK WITH AUDIO DEVICE HOLDER

(71) Applicant: Team IP Holdings, LLC, Grand Prairie, TX (US)

(72) Inventors: Timothy D. Schnell, Del Mar, CA (US); Tal Daniel Kocen, Bedford, TX (US); Steve Iseberg, Schaumburg, IL (US)

(73) Assignee: Team IP Holdings, LLC, Grand Prairie, TX (US)

( * ) Notice: Subject to any disclaimer, the term of this patent is extended or adjusted under 35 U.S.C. 154(b) by 0 days.

(21) Appl. No.: 17/326,679

(22) Filed: May 21, 2021

(65) Prior Publication Data

US 2021/0368281 A1 Nov. 25, 2021

Related U.S. Application Data

(60) Provisional application No. 63/029,314, filed on May 22, 2020.

(51) Int. Cl.
*H04R 25/00* (2006.01)
*A41D 13/11* (2006.01)

(52) U.S. Cl.
CPC ......... *H04R 25/65* (2013.01); *A41D 13/1161* (2013.01); *H04R 2225/021* (2013.01)

(58) Field of Classification Search
CPC ................... H04R 25/65; H04R 2225/1161
See application file for complete search history.

(56) References Cited

U.S. PATENT DOCUMENTS

| 3,603,315 A | 9/1971 | Becker |
| 5,584,078 A | 12/1996 | Saboory |
| 8,041,063 B2 | 10/2011 | Iwano et al. |
| 8,861,762 B2 | 10/2014 | Topholm et al. |
| 10,925,333 B1 | 2/2021 | McKenzie |
| 2014/0215696 A1* | 8/2014 | Polit ............... A61F 11/08 2/423 |

FOREIGN PATENT DOCUMENTS

| CN | 212088284 U | 12/2020 |
| FR | 2004889 A1 | 12/1969 |
| GB | 1009818 A * | 8/1964 |
| GB | 1009818 A * | 11/1965 |

OTHER PUBLICATIONS

International Search Report and Written Opinion for PCT Application No. PCT/US2021/033247, dated Sep. 6, 2021, in 13 pages.

* cited by examiner

*Primary Examiner* — Sunita Joshi
(74) *Attorney, Agent, or Firm* — Knobbe, Martens, Olson & Bear, LLP

(57) ABSTRACT

Face masks and attachments to accommodate hearing aids are provided herein. The face masks include a mask body, ear loops and a hearing aid holder to removably hold a hearing aid. In some configurations, a hearing aid holder which can be detachably attached to a mask is provided.

13 Claims, 11 Drawing Sheets

FACE MASK WITH AUDIO DEVICE HOLDER

BACKGROUND

Any and all applications for which a domestic priority claim is identified in the Application Data Sheet of the present application are hereby incorporated by reference under 37 CFR 1.57.

FIELD

The present disclosure relates generally to masks, and more specifically to medical style face masks.

DESCRIPTION OF THE RELATED ART

Face masks, such as surgical face masks, are widely worn to protect users and others. Face masks are often worn by healthcare professionals to protect themselves and patients. Such masks can catch bacterial and viral particles shed from the wearer's mouth and nose. Face masks also limit the spread of contagious diseases, for example those caused by bacteria or virus. Some common types of face masks include ear straps to loop around the user's ears, to hold the mask on the user's face.

SUMMARY

Existing face masks can interfere with other devices worn by users, including hearing aids or other audio devices, glasses, and the like. In particular, the body of a behind-the-ear (BTE) hearing aid hangs behind the ear of the user, and the presence of the ear straps/loops of the face mask around the ear may inhibit proper engagement or positioning of the hearing aid to the ear of the user, and cause discomfort to the user. Further, the behind-the-ear (BTE) hearing aid often includes a cable connecting the body of the hearing aid to an earpiece for placement in the ear canal of the user, and the ear straps/loops of the face mask around the ear can cross and/or interfere with the cable. For example, when the user puts on or takes off a conventional mask, the mask straps often dislodge the hearing aid or other audio device.

Accordingly, there is a need for a face mask such as a medical style face mask which can accommodate hearing aids or other devices worn in proximity to the mask straps or other portions of the mask, or any attachments to a face mask which can accommodate hearing aids, among other things.

In accordance with one aspect of the invention, a face mask system is provided. The face mask system comprises a mask body for covering a portion of a face of a user; an ear strap attached to the mask body and configured to engage an ear of a user and hold the mask body in front of the mouth of the user; and a hearing aid holder comprising a holding member configured to releasably hold a hearing aid.

The face mask system of any of the preceding paragraphs and/or any of the face mask systems disclosed herein can include one or more of the following features. The holding member of the hearing aid holder can comprise a pocket configured to releasably hold at least a portion of the hearing aid therein. The pocket can be configured to expose a portion of the hearing aid when the hearing aid is positioned within the pocket. The holding member of the hearing aid holder can comprise a metal element configured to magnetically interact with the hearing aid to hold the hearing aid and mask together. The metal element can comprise a magnet configured to hold the hearing aid by magnetically attaching to a corresponding metal element supported by the hearing aid. The metal element of the hearing aid can be a metal plate having a thickness of 0.5 mm or less. The hearing aid holder can be permanently attached to the ear loop and configured to be positioned behind the ear of the user when the ear loop is engaged around the ear of the user. The hearing aid holder can be configured to be releasably coupled to the ear loop. The hearing aid holder can comprise a holder body configured to wrap around the ear loop and detachable attach to itself. The hearing aid holder can comprise one or magnets configured to detachably attach a portion of the hearing aid holder to another portion of the hearing aid holder, such that the holder body wraps around the ear loop. The hearing aid holder can comprise a groove to receive the ear loop of the face mask and releasably retain the ear loop of the face mask.

In accordance with another aspect of the invention, a hearing aid holder for a face mask is provided. The hearing aid holder comprises a holding member configured to releasably holding a hearing aid, wherein the hearing aid holder is configured to be detachably coupled to an ear loop of the face mask.

The hearing aid holder of any of the preceding paragraphs and/or any of the hearing aid holders disclosed herein can include one or more of the following features. The holding member of the hearing aid holder can comprise a pocket configured to releasably hold at least a portion of the hearing aid therein. The pocket can be configured to expose a portion of the hearing aid when the hearing aid is positioned within the pocket. The holding member of the hearing aid holder can be a metal element configured to interact with a corresponding metal element of the hearing aid to magnetically hold the hearing aid. The metal element of the holding member can be a magnet configured to magnetically attach to a corresponding metal element of the hearing aid. The metal element of the hearing aid can be a plate having a thickness of 0.5 mm or less. The hearing aid holder can comprise a holder body configured to wrap around the ear loop and detachable attach to itself. The hearing aid holder can comprise one or magnets configured to detachably attach a portion of the hearing aid holder to another portion of the hearing aid holder, such that the holder body wraps around the ear loop. The hearing aid holder can comprise a groove to receive the ear loop of the face mask and releasably retain the ear loop of the face mask.

In accordance with another aspect of the invention, a face mask is provided. The face mask comprises an audio device holder comprising an holding member configured to releasably holding an audio device, wherein the audio device holder is configured to be detachably coupled to an ear loop of the face mask.

The face mask of any of the preceding paragraphs and/or any of the face masks disclosed herein can include one or more of the following features. The audio device can be a hearing aid. The audio device can be an earbud style earphone. The holding member can comprise a pocket configured to releasably hold at least a portion of the audio device therein. The pocket can be configured to expose a portion of the audio device when the audio device is positioned within the pocket. The holding member can comprise a metal element configured to interact with a corresponding metal element of the audio device to magnetically hold the audio device. The metal element of the holding member can be a magnet configured to magnetically attach to a corresponding metal element of the audio device. The metal element of the audio device can be a plate having a thickness of 0.5 mm or less. The audio device holder can comprise a holder body configured to wrap around the ear loop and detachable attach to itself. The audio device holder can comprise one or magnets configured to detachably attach a portion of the audio device holder to another portion of the audio device holder, such that the holder body wraps around the ear loop. The audio device holder can comprise a groove to receive the ear loop of the face mask and releasably retain the ear loop of the face mask.

DETAILED DESCRIPTION

Figure 1:
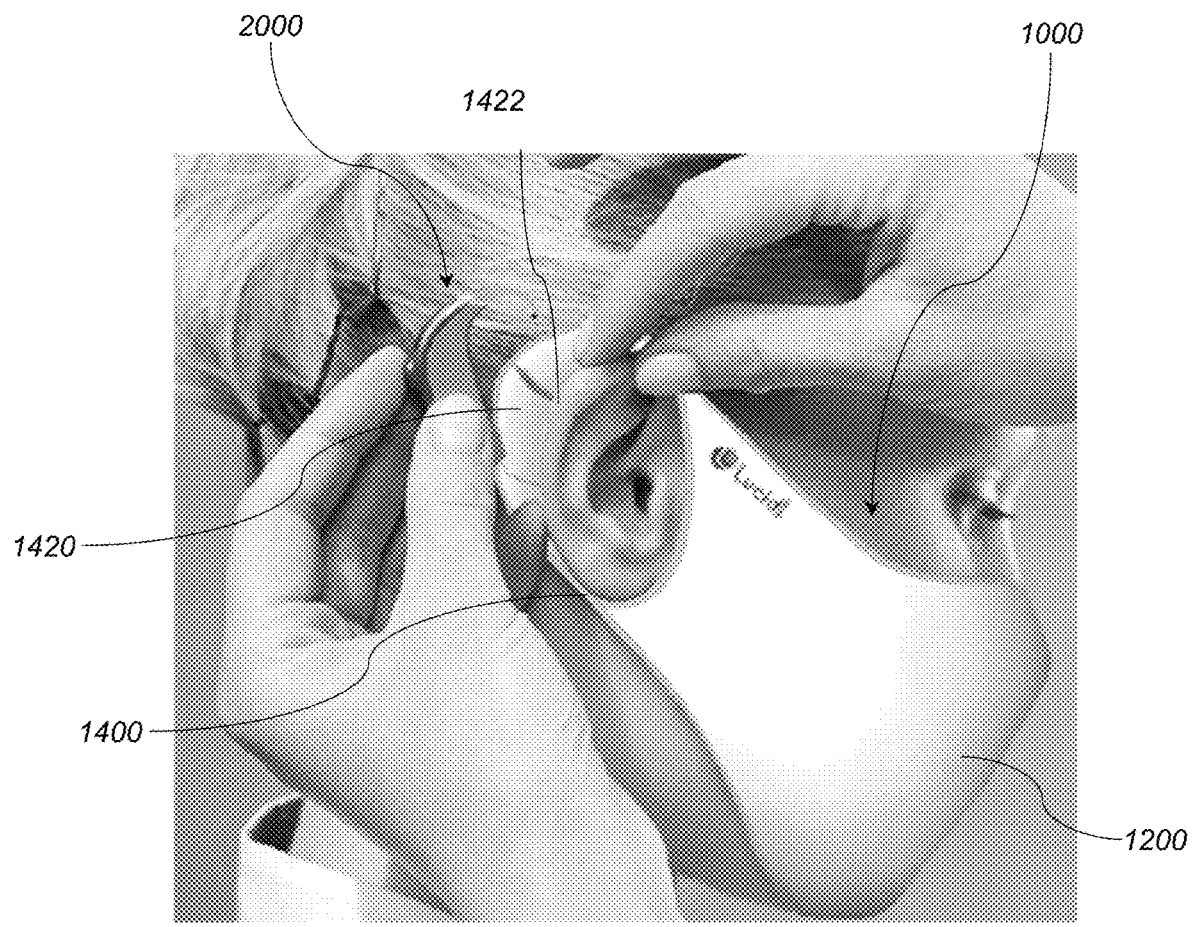
FIG. 1 is a side view of a face mask according to one embodiment of the present disclosure and a hearing aid.

The following detailed description is directed to certain implementations for the purposes of describing the innovative aspects. However, the teachings herein can be applied in a multitude of different ways. As will be apparent from the following description, a face mask can be implemented in a wide variety of form factors (e.g., surgical mask, respirator, cloth mask, dust mask and hygiene mask) and can include a wide range of features and functionality.
Face Mask with Hearing Aid Holder FIG. 1 illustrate a face mask 1000 worn by a user. In the illustrated embodiment, the face mask 1000 includes a mask body 1200 and a pair of ear loops 1400, while only one of the ear loops 1400 is shown in FIG. 1. The mask body 1200 can cover a portion of the user's face, for example mouth and/or nose. The ear loops 1400 are attached to each side of the mask body 1200, and the ear loops 1400 can loop around ears of the user to position and hold the mask body 1200 on the face of the user.

The mask body 1200 and the ear loops 1400 may have any suitable shape to cover the face of the user, and may have any shape or design known in the field. The mask body 1200 and the ear loops 1400 may be constructed from any suitable material known in the art. The face mask 1000 can be implemented in a wide variety of form factors (e.g., surgical mask, respirator, cloth mask, dust mask and hygiene mask) and can include a wide range of features and functionality.

In some embodiments, the ear loops 1400 may include a hearing aid holder which can accommodate a hearing aid 2000 (e.g. behind the ear (BTE) hearing aid). The hearing aid holder may releasably hold the hearing aid behind the ear of the user, such that the hearing aid can be worn by the user simultaneously with the face mask 1000. When the hearing aid is worn by a user simultaneously with a face mask, without a hearing aid holder, the ear loops 1400 may inhibit proper engagement or positioning of the hearing aid to the ear of the user and may disengage the hearing aid from the ear of the user. The hearing aid may be moved or disturbed by the ear loops when the face mask is being worn, taken off or adjusted. However, if the hearing aid can be held with the hearing aid holder to the ear loops 1400, the hearing aid holder can maintain the engagement of the hearing aid to the ear of the user. The hearing aid holder may be positioned at a portion of the ear loops 1400 that can be placed behind the ear of a user when the mask 1000 is worn by the user, such that the hearing aid can be properly positioned when held by the hearing aid holder. In some embodiments, the hearing aid holder may be positioned to each of the ear loops 1400. In some embodiments, the hearing aid holder may be positioned to either one of the ear loops 1400.

In some embodiments, the hearing aid holder includes a pocket 1420 as shown in FIG. 1. The pocket 1420 may include an opening 1422 through which the hearing aid 2000 can be inserted. The pocket 1420 can releasably hold the hearing aid 2000 therein, to keep the hearing aid 2000 positioned behind the ear of the user. In some embodiments, the pocket 1420 is constructed from one or more flexible materials, such that the pocket 1420 can expand and accommodate the hearing aids having various sizes. In some embodiments, the pocket 1420 is constructed from one or more elastic materials, such that the pocket 1420 can hold the hearing aid 2000 by friction when the hearing aid 2000 is inserted into the pocket 1420. In some embodiments, the pocket 3440 may be constructed from same material with the ear loop 1400. In some embodiments, the pocket 1420 may be constructed from elastic fabric materials, rubber, latex or any other suitable materials known in the art. In some embodiments, the pocket 1420 have a mechanism to inhibit the hearing aid 2000 from slipping out of the pocket 1420, such as a rubber strip and anti-strip bars.

Figure 2A:
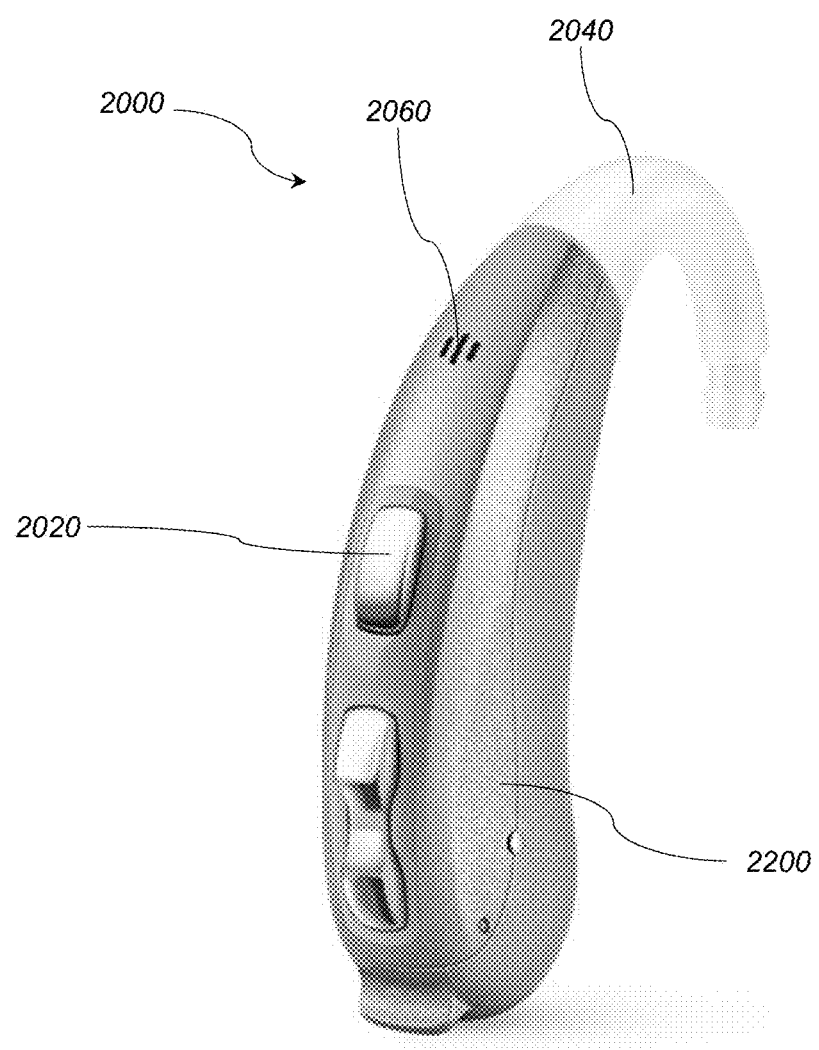
FIG. 2A is a perspective view of a hearing aid according to one embodiment.
Figure 2B:
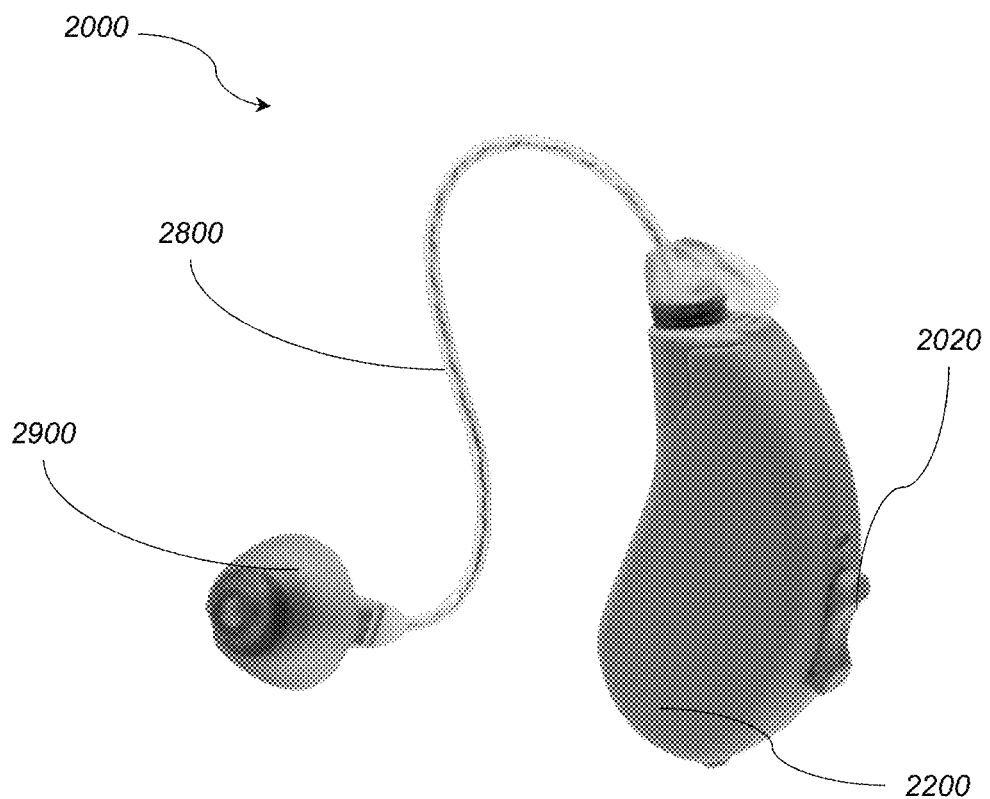
FIG. 2B is a perspective view of a hearing aid according to one embodiment.

The pocket 1420 may be shaped to generally accommodate one or more types of one or more hearing aids 2000. For example, the pocket 1420 may have rectangular or generally rectangular shape. In some embodiments, the pocket 1420 may be sized or shaped to accommodate only a portion of the hearing aid 2000, such that a portion of the hearing aid 2000 can be exposed when the hearing aid 2000 is inserted into the pocket 1420. The user can easily pull the hearing aid 2000 out of the pocket 1420 by gripping the exposed portion of the hearing aid 2000. Further, it would be advantageous for controls or other parts, such as microphones, of the hearing aid 2000 to be exposed for better control and functioning of the hearing aid 2000. For example, FIG. 2A illustrates the hearing aid 2000 according to one embodiment. The illustrated embodiment of the hearing aid 2000 includes a body 2200, one or more controls 2020 on the body 2200 for controlling the hearing aid 2000, an ear hook 2040 for engaging the hearing aid 2000 to the ear of a user, and a microphone 2060 on a body 2200 for receiving sounds. FIG. 2B illustrates the hearing aid 2000 according to another embodiment. The illustrated embodiment of the heading aid 2000 includes an ear piece 2900 for placing in an ear canal of the user, and a cable connecting the ear piece 2900 and the top portion of the body 2000. While other hearings aids depicted herein, including those shown in FIGS. 1, 2A, 3-5, and 9-12 are not illustrated with a cable and ear piece, those hearing aids 2000 and any of the hearing aids 2000 described herein can include a cable and ear piece similar to those shown in FIG. 2B. By exposing a top portion of the hearing aid 2000, one or more of the controls 2020, the ear hook 2040, the microphone 2060 and the cable 2900 may be exposed when the hearing aid 2000 is inserted into the pocket 1420. In some embodiment, the depth of the pocket 1420 may cover 70% or less, 60% or less, 50% or less, 40% or less, or 30% or less of the height of the hearing aid 2000 from the bottom of the hearing aid 2000.

In some embodiments, at least a portion of the pocket 1420 is constructed from a material thin enough to allow the user to actuate the controls 2020 of the hearing aid 2000 even when the controls 2020 is covered within the pocket 1420. For example, at least a portion of the pocket 1420 may have a thickness of 1 mm or less, 0.7 mm or less, 0.5 mm or less, or 0.3 mm or less. In some embodiments, the pocket 1420 may include an opening or cutout to expose the controls 2020 and/or other components of the hearing aid 2000.

In the embodiment shown in FIG. 1, the pocket 1420 is attached to the ear loop 1400. In some embodiments, the pocket 1420 is permanently attached or integrally formed with the ear loop 1400. For example, the pocket 1420 may be constructed from an additional sheet of fabric attached to the ear loop 1400 throughout the perimeter of the sheet of fabric except at the opening 1422, as shown in FIG. 1. In some embodiments, the pocket 1420 can be attached to the ear loop 1400 by an adhesive, welding, or sewing. In some embodiments, the ear loop 1400 may have enough thickness to accommodate the pocket 1420. For example, at least a portion of the ear loop 1400 may have a thickness same or greater than the width of the pocket 1420. In some embodiments, the pocket 1420 can be detachably attached to the ear loop 1400, as described in greater detail elsewhere in the specification.

Figure 3:
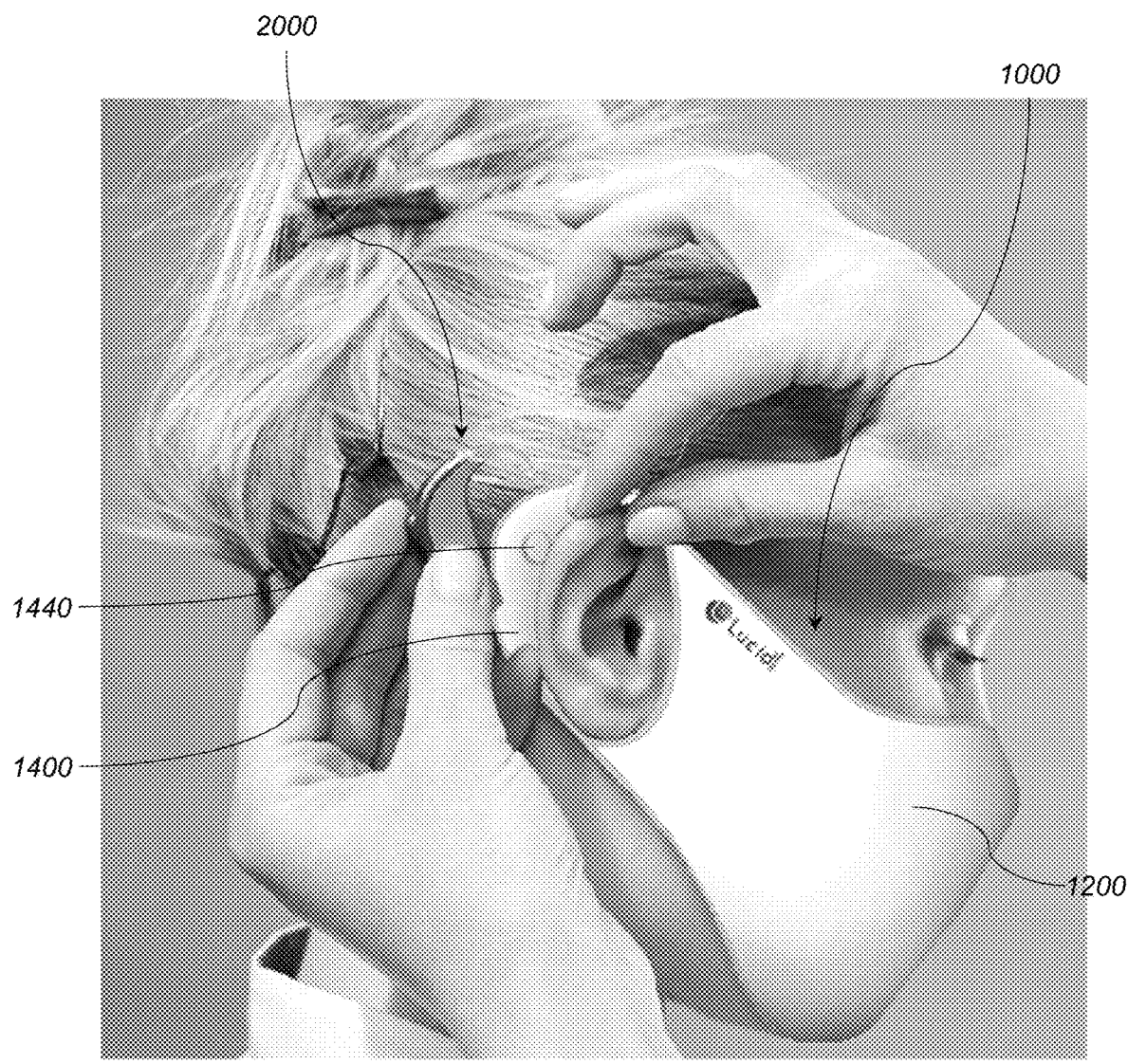
FIG. 3 is a side view of a face mask according to one embodiment of the present disclosure and a hearing aid.

In some embodiments, the hearing aid holder includes a magnet 1440 as shown in FIG. 3. The magnet 1440 may releasably hold the hearing aid 2000 by magnetically attaching to a metal piece attached to the hearing aid 2000. In some embodiments, the magnet 1400 may magnetically attach to the hearing aid 2000. For example, a body of the hearing aid 2000 may be at least partially constructed from a metal, or a piece of metal may be included within the hearing aid 2000, and the magnet 1440 can attach to the hearing aid 2000 directly. The magnet can be made of magnetized metal such as iron or steel for example.

In some embodiments, the magnet 1440 may be positioned on or in the ear loop 1400. In some embodiments, the magnet 1440 may be fully positioned within the ear loop 1400. For example, the magnet 1440 may be positioned within fabric layers of the ear loop 1400. The magnet 1440 may be attached on the ear loop 1400. In some embodiments, the magnet 1440 may be at least partially exposed. In some embodiments, the magnet 1440 may be attached to the ear loop 1400 by an adhesive, welding or sewing.

In some embodiments, the magnet 1440 may have a size large enough to generate sufficient magnetic force to support the hearing aid 2000, while the size of the magnet 1440 may be limited to minimize discomfort of the user. For example, the magnet 1440 may have a diameter, a width, or a height between 0.1 cm to 5 cm, 0.3 cm to 5 cm, 0.3 cm to 3 cm, 0.5 cm to 3 cm, 0.5 cm to 2 cm, The magnet 1440 may have a thickness of 5 mm or less, 4 mm or less, 3 mm or less, 2 mm or less, 1 mm or less. The magnet 1440 may have any suitable shape. For example, the magnet 1440 may have circular shape, elliptical shape, square shape or rectangular shape.

Figure 4:
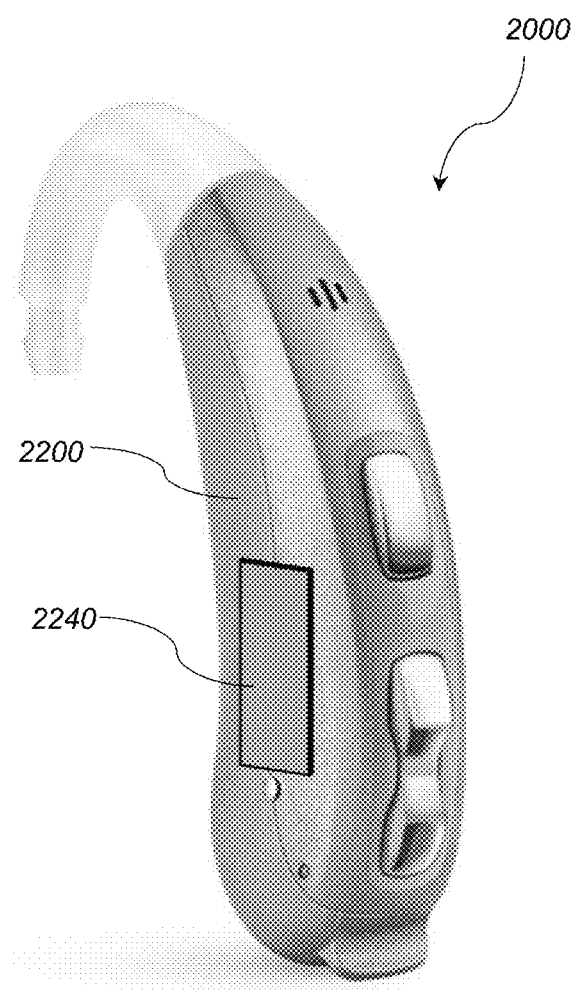
FIG. 4 is a perspective view of a hearing aid according to one embodiment.

FIG. 4 illustrates the hearing aid 2000 having a metal member 2240 attached to a side surface of the body 2200. The metal member 2240 may be a strong metal such as iron or cobalt, for example, and can be magnetically attached to the magnet 1440 shown in FIG. 3. The metal member 2240 may be attached to the hearing aid 2000 by an adhesive, welding or by any suitable means. The metal member 2240 may be attached to the hearing aid 2000 with sufficient force, such that it is stronger than the magnetic force exerted from the magnet 1440, and the metal member 2240 can be kept attached to the hearing aid 2000 after multiple engagement/disengagement cycles between the hearing aid 2000 and the mask 1000.

In some embodiment, the metal member 2240 may be provided together with the face mask 1000, or a hearing aid holder to a user as a kit, such that the user may attach the metal member 2240 to a hearing aid. The metal member 2240 may include a pre-applied adhesive on one side, such that the user can apply the metal member 2240 to the hearing aid with the adhesive. The metal member 2240 may include a backing layer, such that the user can remove it before applying the metal member 2240 to the hearing aid 2000.

The metal member 2240 may have any suitable shape. For example, the metal member 2240 may be a metal plate, such as a circular plate, a square plate, a rectangular plate, or an elliptical plate. The metal member 2240 may have a sufficient area to be attached to the magnet 1440. In some embodiments, the metal member 2240 may have larger area than the magnet 1440, such that the user can adjust the position of hearing aid 2000 relative to the magnet 1440 in some degree. In some embodiments, the metal member 2240 may have a same or smaller area than the magnet 1440.

In some embodiments, the metal member 2240 may have a minimal thickness, such that the hearing aid 2000 may be worn with the metal member 2240 attached to it without causing significant discomfort to the user. The minimal thickness of the metal member 2240 may enable the user to wear the hearing aid 2000 with the metal member 2240 kept attached to it, even when the mask 1000 is not worn by the user, such that there is no need to remove the metal member 2240 from the hearing aid 2000. Further, it would reduce the risk of losing the metal member 2240. In some embodiments, the metal member 2240 may have a thickness of 1 mm or less, 0.7 mm or less, 0.6 mm or less, 0.5 mm or less, 0.4 mm or less, 0.3 mm or less, 0.2 mm or less, or 0.1 mm or less.

In some embodiments, the hearing aid holder may incorporate multiple means to hold the hearing aid. For example, the ear loop 1400 may include both the pocket 1420 and the magnet 1440 together, such that the hearing aid 2000 may be held within the pocket 1420, with additional magnetic force from the magnet 1440.

In some embodiments, multiple metal members 2240 may be provided as a kit to the user, such that the user may attach metal members 2240 to multiple hearing aids, and the user can use the multiple hearing aids with the face mask 1000 interchangeably. In some embodiments, the one or more metal members 2240 may be provided with the face mask 1000 as a kit. In some embodiments, the kit may also include the hearing aid 2000. In some alternative embodiments, the components of the magnetic connection are reversed, and the hearing aid holder of the mask 1200 includes a piece of metal instead of a magnet, such as iron, cobalt or some other strong metal, while the hearing aid 2000 includes a magnet.

Detachable Hearing Aid Holder

In some embodiments, a hearing aid holder which can detachably attached to a face mask may be provided. The detachable hearing aid holder may releasably hold a hearing aid similarly with the hearing aid holders described in relation with FIGS. 1 and 3. The hearing aid holder may be detachably attached to a wide variety of face masks, or to any types of face masks, such as face masks described herein. Further, the detachable hearing aid holder may be used repeatedly with multiple single-use masks or masks with limited life-span which lose their protective function after a prolonged use, such as surgical masks or procedural mask, so the detachable hearing aid holder may have an economical advantage.

Figure 5:
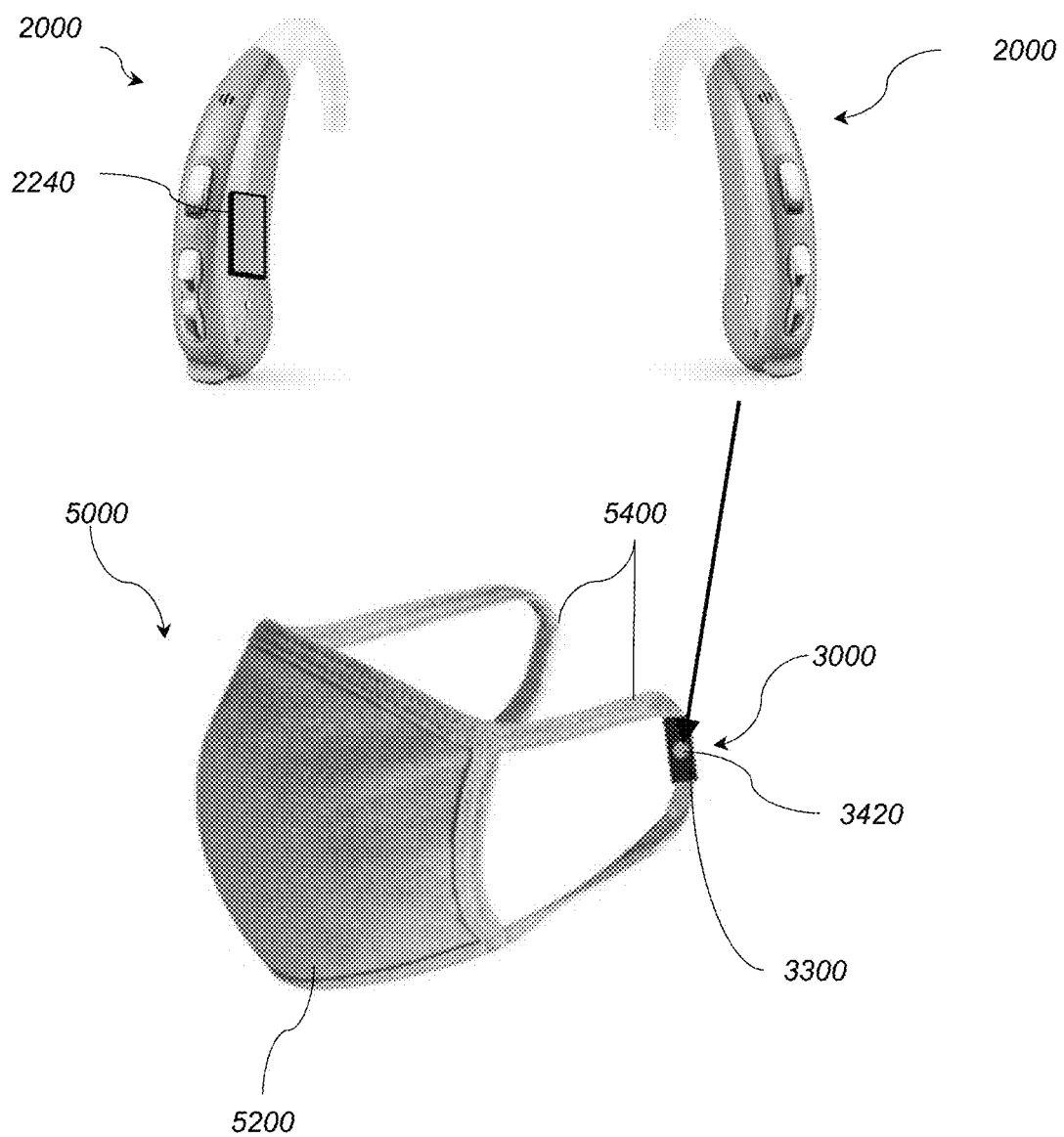
FIG. 5 is a perspective view of a face mask, a hearing aid, and a hearing aid holder according to one embodiment of the present disclosure.

In some embodiments, the hearing aid holder may be detachably attached to an ear loop of the face mask. FIG. 5 illustrates a hearing aid holder 3000 detachably attached to an ear loop 5400 of a face mask 5000. The hearing aid holder 3000 may include a magnet 3420 to hold the hearing aid 2000 with the metal member 2240, similarly to the magnet 1440 described in relation with FIGS. 3-4. The face mask 5000 may be similar with the face mask 1000 described in relation with FIGS. 1 and 3, except as described herein. For example, the face mask 5000 includes a mask body 5200 to cover a portion of a user's face, and the ear loops 5400 are attached to each side of the mask body 5200, and the ear loops 5400 can loop around ears of the user to position and hold the mask body 5200 on the face of the user.

In the illustrate embodiment of FIG. 5, the hearing aid holder 3000 is wrapped around the ear loop 5400. The hearing aid holder 3000 may include a holder body 3300 which can wrap around the ear loop 5400. The holder body 3300 may be constructed from a flexible material, such that the holder body 3300 can be folded and/or loop around the ear loop 5400. For example, the holder body 3300 may be constructed from a knitted, woven, or non-woven fabric material. The holder body 3300 may be wrapped around the ear loop 5400 tightly enough to generate friction to inhibit moving of the hearing aid holder 3000 along the length of the ear loop 5400. In some embodiments, the holder body 3300 may have components to increase friction, such as rubber attachments, at a surface which can face the ear loop 5400.

Figure 6:
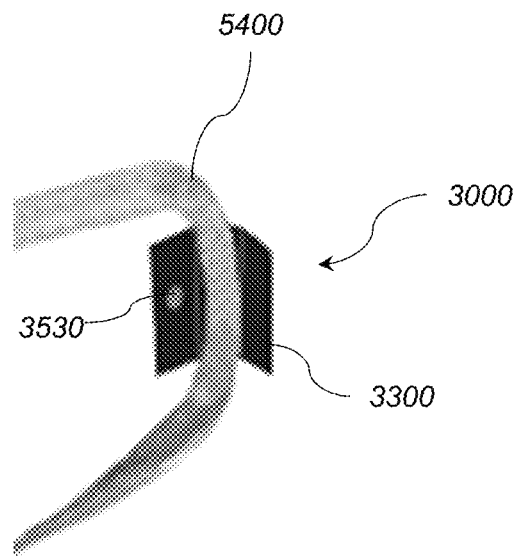
FIGS. 6-8 are enlarged views a portion of the face mask and the hearing aid holder of FIG. 5.
Figure 7:
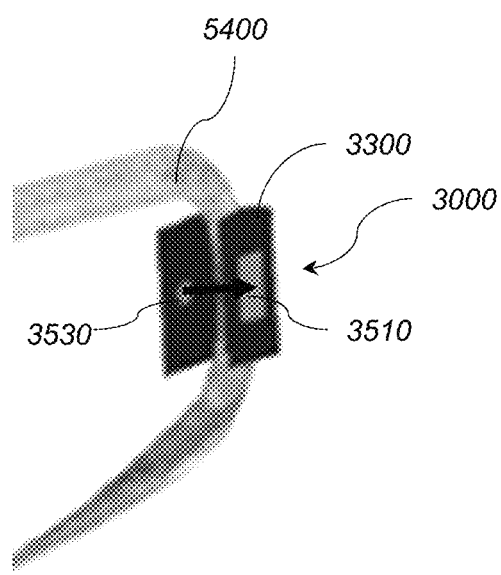
Figure 8:
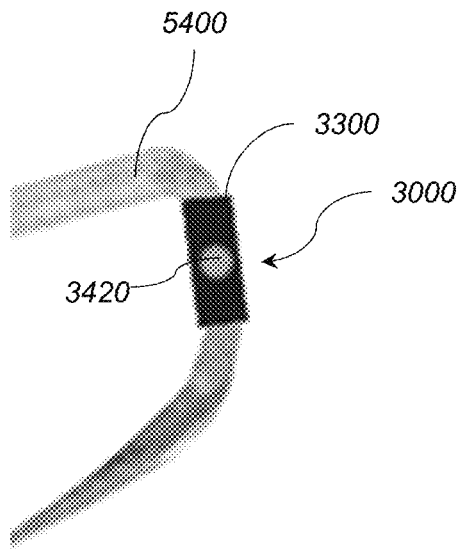

FIGS. 6-8 illustrate how the hearing aid holder 3000 can be wrapped around the ear loop 5400. In some embodiments, the hearing aid holder 3000 may include one or more attachment members to attach a portion of the holder body 3300 to another portion of the holder body 3300, such that the attachment mechanisms can keep the holder body 3300 looped around or wrapped around the ear loop 5400. In the illustrated embodiment, the hearing aid holder 3000 includes attachment members 3510 and 3530. The attachment members 3510 and 3510 can detachably attached to each other to keep the holder body 3300 wrapped around the ear loop 5400 as shown in FIGS. 7 and 8. In some embodiment, the attachment member 3510 is a metal member and the attachment member 3530 is a magnet, such that they can be magnetically attached to each other. In some embodiments, the magnet 3510 and the magnet 3420 can be opposite side of a single magnet, such that the single magnet can be used both for detachably attaching to the ear loop 5400 and releasably holding the hearing aid 2000. In some embodiments, the attachment member 3510 is a magnet and the attachment member 3530 is a metal member, or the attachment members 3510 and 3530 are both magnets to be attracted to each other. The attachment members 3510 and 3530 may include any other suitable detachable attachment mechanisms which can withstand multiple attachments/detachments. For example, the attachment members 3510 and 3530 may include hook-and-loop fasteners.

Turning back to FIG. 5, the magnet 3420 may be positioned on or in the holder body 3300. In some embodiments, the magnet 3420 may be fully positioned within the holder body 3300. For example, the magnet 3420 may be positioned within fabric layers of the holder body 3300. The magnet 3420 may be attached on the holder body 3300. In some embodiments, the magnet 3420 may be at least partially exposed. In some embodiments, the magnet 3420 may be attached to the holder body 3300 by an adhesive, welding or sewing.

The magnet 3420 may be similar with the magnet 1440 described with regard to FIG. 3, and the description of the magnet 1440 may be applied to the magnet 3420. For example, the magnet 3420 may have a size large enough to generate sufficient magnetic force to support the hearing aid 2000, while the size of the magnet 3420 may be limited to minimize discomfort of the user. For example, the magnet 3420 may have a diameter, a width, or a height between 0.1 cm to 5 cm, 0.3 cm to 5 cm, 0.3 cm to 3 cm, 0.5 cm to 3 cm, 0.5 cm to 2 cm. The magnet 3420 may have a thickness of 5 mm or less, 4 mm or less, 3 mm or less, 2 mm or less, 1 mm or less. The magnet 3420 may have any suitable shape. For example, the magnet 3420 may have circular shape, elliptical shape, square shape or rectangular shape.

Figure 9:
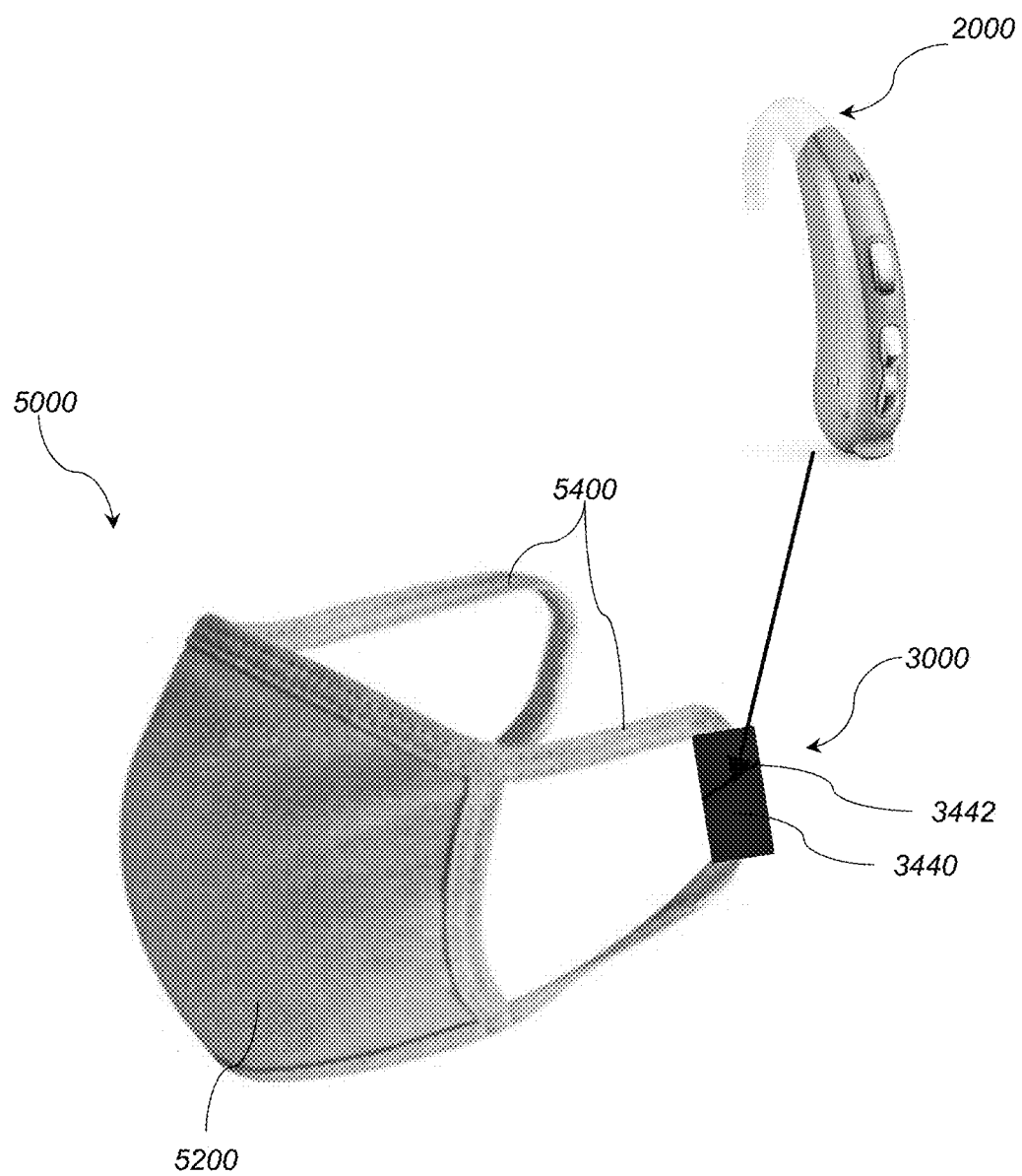
FIG. 9 is a perspective view of a face mask, a hearing aid, and a hearing aid holder according to one embodiment of the present disclosure.

In some embodiments, the detachable hearing aid holder 3000 may include a pocket 3440 as shown in FIG. 9. The pocket 3440 can releasably hold the hearing aid 2000 therein, and may be similar with the pocket 1420 described in relation with FIG. 1. For example, the pocket 3440 may include an opening 3442 through which the hearing aid 2000 can be inserted. The pocket 3440 can releasably hold the hearing aid 2000 therein, to keep the hearing aid 2000 positioned behind the ear of the user. In some embodiments, the pocket 3440 is constructed from one or more flexible materials, such that the pocket 3440 can expand and accommodate the hearing aids having various sizes. In some embodiments, the pocket 3440 is constructed from one or more elastic materials, such that the pocket 3440 can hold the hearing aid 2000 by friction when the hearing aid 2000 is inserted into the pocket 3440. In some embodiments, the pocket 3440 may be constructed from elastic fabric materials, rubber, latex or any other suitable materials known in the art. In some embodiments, the pocket 3440 may be constructed from same material with the holder body 3300. In some embodiments, the pocket 3440 have a mechanism to inhibit the hearing aid 2000 from slipping out of the pocket 3440, such as a rubber strip and anti-strip bars.

The pocket 3440 may be shaped to generally accommodate to the shape of one or more hearing aids 2000. For example, the pocket 3440 may have rectangular or generally rectangular shape. In some embodiments, the pocket 3440 may be sized or shaped to accommodate only a portion of the hearing aid 2000, such that a portion of the hearing aid 2000 can be exposed when the hearing aid 2000 is inserted into the pocket 3440. The user can easily pull the hearing aid 2000 out of the pocket 3440 by gripping the exposed portion of the hearing aid 2000. Further, it would be advantageous for controls or other parts, such as microphones, of the hearing aid 2000 to be exposed for better control and functioning of the hearing aid 2000. In some embodiment, the depth of the pocket 3440 may cover 70% or less, 60% or less, 50% or less, 40% or less, or 30% or less of the height of the hearing aid 2000 from the bottom of the hearing aid 2000.

In some embodiments, at least a portion of the pocket 3440 is constructed from a material thin enough to allow the user to actuate the controls 2020 of the hearing aid 2000 even when the controls 2020 is covered within the pocket 3440. For example, at least a portion of the pocket 3440 may have a thickness of 1 mm or less, 0.7 mm or less, 0.5 mm or less, or 0.3 mm or less. In some embodiments, the pocket 3440 may include an opening or cutout to expose the controls 2020 and/or other components of the hearing aid 2000.

In some embodiments, the pocket 3440 is permanently attached or integrally formed with the holder body 3300. For example, the pocket 3440 may be constructed from an additional sheet of fabric attached to the holder body 3300 throughout the perimeter of the sheet of fabric except at the opening 3442. In some embodiments, the pocket 3440 can be attached to the holder body 3300 by an adhesive, welding, or sewing.

In FIGS. 5 and 9, only one hearing aid holder 3000 is shown, but in some embodiment, the hearing aid holder 3000 may be detachably attached to each of the pair of the ear loops 5400.

Figure 10:
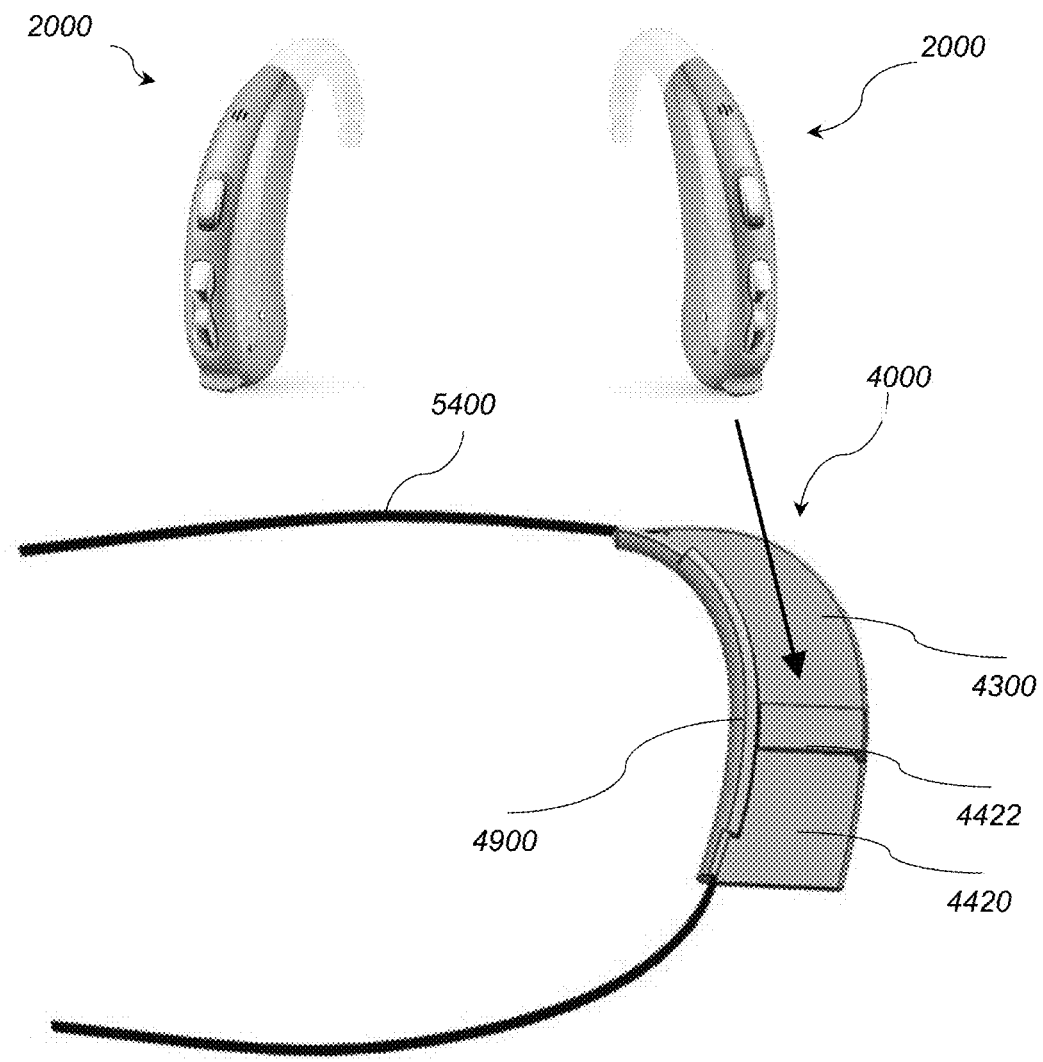
FIG. 10 is a side view of a portion of a face mask and a hearing aid holder according to one embodiment of the present disclosure and a hearing aid.
Figure 11:
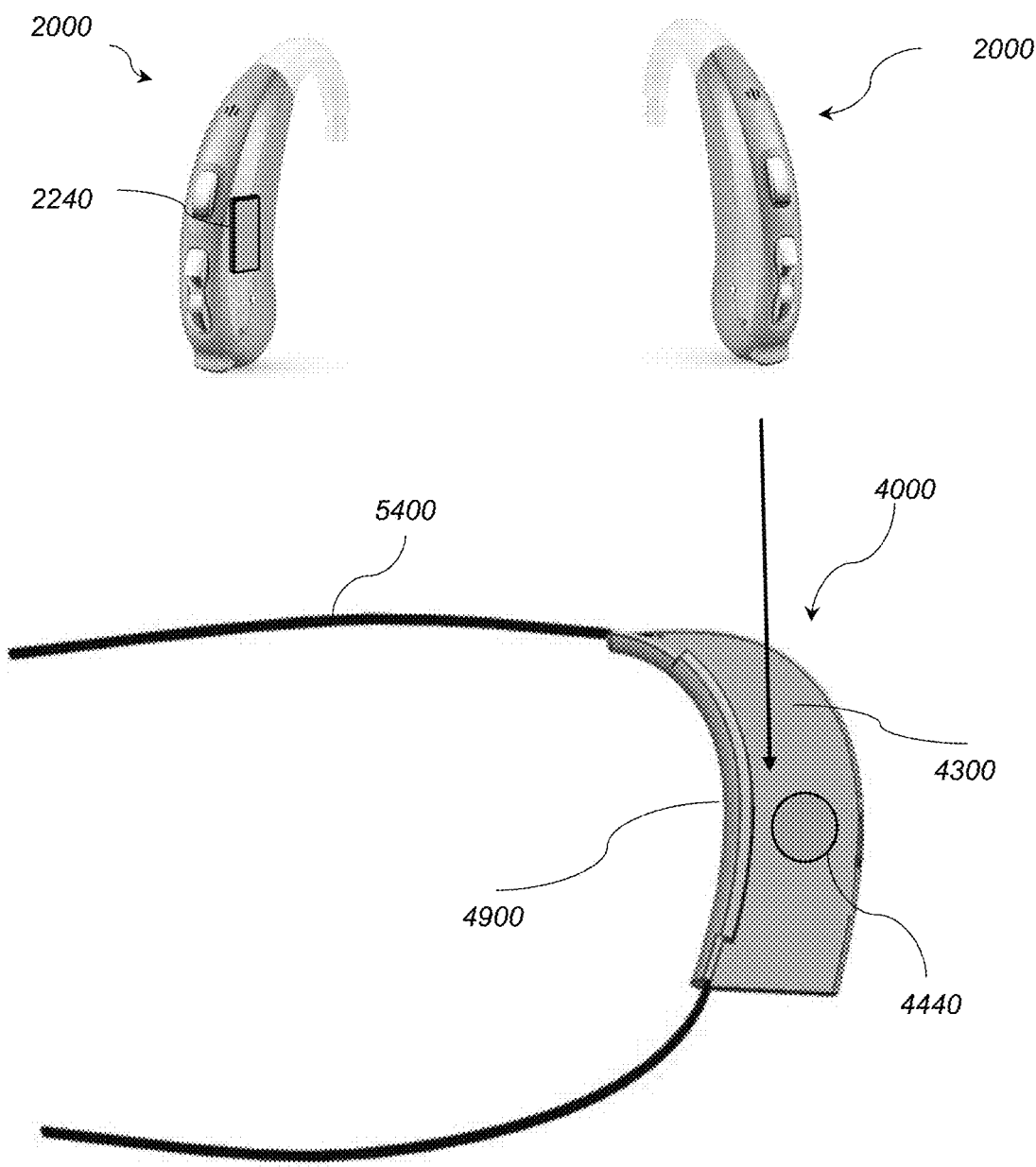
FIG. 11 is a side view of a portion of a face mask and a hearing aid holder according to one embodiment of the present disclosure and a hearing aid.

FIGS. 10 and 11 illustrate a detachable hearing aid holder 4000. The detachable hearing aid holder 4000 may be similar with the hearing aid holder 3000, except as described herein. In the illustrated embodiment, the hearing aid holder 4000 include a holder body 4300. The holder body 4300 may include a groove or cavity 4900 to receive the ear loop 5400 and be detachably attached to the ear loop 5400. The holder body 4300 may be constructed from an elastic, flexible material, such that the groove or cavity 4900 can detachably hold the ear loop 5400 by friction. For example, the holder body 4300 may be constructed from a silicone, rubber or latex.

As shown in FIG. 10, the hearing aid holder 4000 may include a pocket 4420 to releasably hold the hearing aid 2000. The pocket 4420 can releasably hold the hearing aid 2000 therein, and may be similar with the pocket 1420 described in relation with FIG. 1 or the pocket 3440 described in relation with FIG. 9. For example, the pocket 4420 may include an opening 4422 through which the hearing aid 2000 can be inserted. The pocket 4420 can releasably hold the hearing aid 2000 therein, to keep the hearing aid 2000 positioned behind the ear of the user. In some embodiments, the pocket 4420 is constructed from one or more flexible materials, such that the pocket 4420 can expand and accommodate the hearing aids having various sizes. In some embodiments, the pocket 4420 is constructed from one or more elastic materials, such that the pocket 4420 can hold the hearing aid 2000 by friction when the hearing aid 2000 is inserted into the pocket 4420. In some embodiments, the pocket 4420 may be constructed from elastic fabric materials, rubber, latex or any other suitable materials known in the art. In some embodiments, the pocket 4420 may be constructed from same material with the holder body 4300. In some embodiments, the pocket 4420 have a mechanism to inhibit the hearing aid 2000 from slipping out of the pocket 4420, such as a rubber strip and anti-strip bars.

The pocket 4420 may be shaped to generally accommodate to the shape of one or more hearing aids 2000. For example, the pocket 4420 may have rectangular or generally rectangular shape. In some embodiments, the pocket 4420 may be sized or shaped to accommodate only a portion of the hearing aid 2000, such that a portion of the hearing aid 2000 can be exposed when the hearing aid 2000 is inserted into the pocket 4420. The user can easily pull the hearing aid 2000 out of the pocket 4420 by gripping the exposed portion of the hearing aid 2000. Further, it would be advantageous for controls or other parts, such as microphones, of the hearing aid 2000 to be exposed for better control and functioning of the hearing aid 2000. In some embodiment, the depth of the pocket 4420 may cover 70% or less, 60% or less, 50% or less, 40% or less, or 30% or less of the height of the hearing aid 2000 from the bottom of the hearing aid 2000.

In some embodiments, at least a portion of the pocket 4420 is constructed from a material thin enough to allow the user to actuate the controls 2020 of the hearing aid 2000 even when the controls 2020 is covered within the pocket 4420. For example, at least a portion of the pocket 4420 may have a thickness of 1 mm or less, 0.7 mm or less, 0.5 mm or less, or 0.3 mm or less. In some embodiments, the pocket 4420 may include an opening or cutout to expose the controls 2020 and/or other components of the hearing aid 2000.

In some embodiments, the pocket 4420 is permanently attached or integrally formed with the holder body 4300. In some embodiments, the pocket 4420 can be attached to the holder body 4300 by an adhesive, welding, or sewing.

As shown in FIG. 11, the hearing aid holder 4000 may include a magnet 4440 to releasably hold the hearing aid 2000. The magnet 4440 can releasably hold the hearing aid 2000 with the metal member 2240. The magnet 4440 may be positioned on or in the holder body 4300. In some embodiments, the magnet 4440 may be fully positioned within the holder body 4300. The magnet 4440 may be attached on the holder body 4300. In some embodiments, the magnet 4440 may be at least partially exposed. In some embodiments, the magnet 4440 may be attached to the holder body 4300 by an adhesive, welding or sewing.

The magnet 4440 may be similar with the magnet 1440 described with regard to FIG. 3 or the magnet 3420 described with regard to FIG. 5, and the description of the magnet 1440 or the magnet 3420 may be applied to the magnet 4440. For example, the magnet 4440 may have a size large enough to generate sufficient magnetic force to support the hearing aid 2000, while the size of the magnet 4440 may be limited to minimize discomfort of the user. For example, the magnet 4440 may have a diameter, a width, or a height between 0.1 cm to 5 cm, 0.3 cm to 5 cm, 0.3 cm to 3 cm, 0.5 cm to 3 cm, 0.5 cm to 2 cm. The magnet 3420 may have a thickness of 5 mm or less, 4 mm or less, 3 mm or less, 2 mm or less, 1 mm or less. The magnet 4440 may have any suitable shape. For example, the magnet 4440 may have circular shape, elliptical shape, square shape or rectangular shape.

Figure 12:
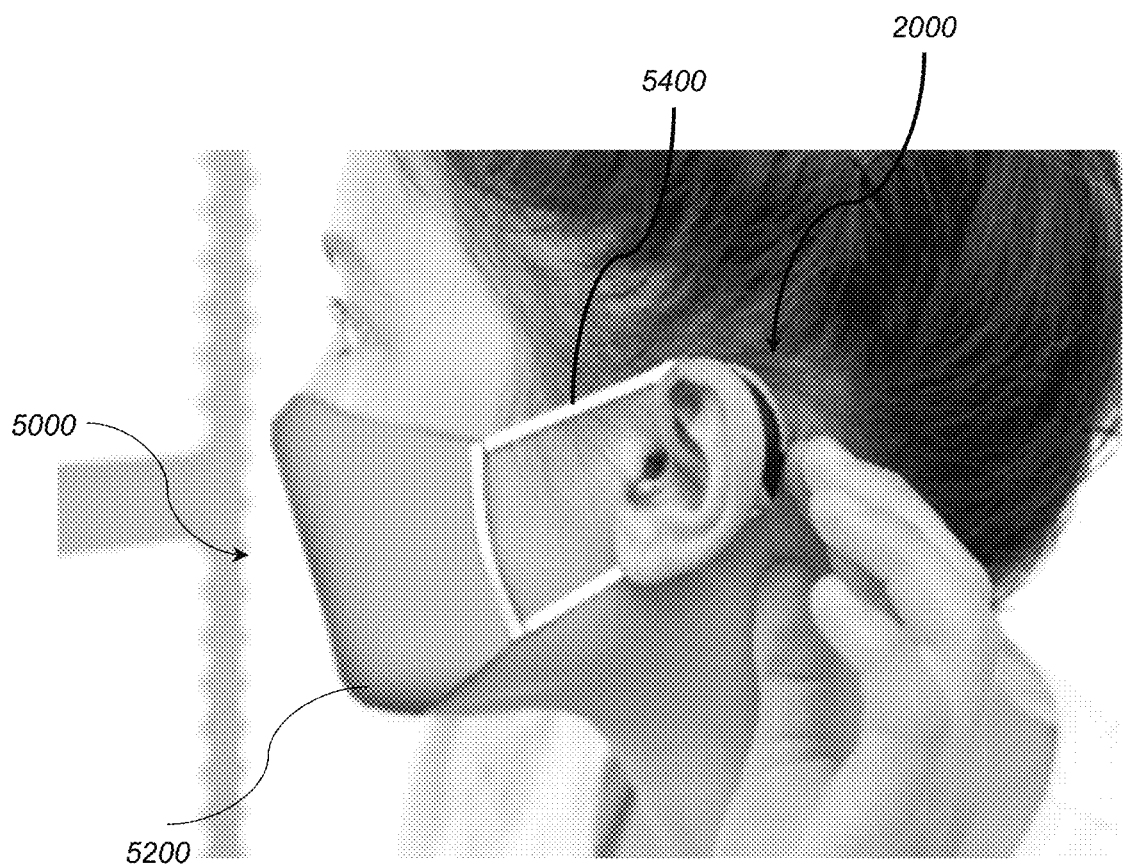
FIG. 12 is a side view of a portion of a face mask and a hearing aid holder according to one embodiment of the present disclosure and a hearing aid.

FIG. 12 illustrates the face mask 5000 and the hearing aid 2000 worn by a user. As shown in FIG. 12, using the magnet 4440, the hearing aid 2000 may be fully exposed behind the ear of the user, and the magnet 4440 may not be visible.

While the illustrated embodiments depict a single hearing aid holder, other embodiments can include holders on each strap to hold hearing aids or other audio devices for each ear. Moreover, while the illustrated embodiments primarily relate to hearing aids, the inventions described herein can additionally be compatible with other types of audio devices and/or adapted to other use cases. For example, the inventions can apply to earbud style Bluetooth earphones, or other types of earphones. In additional embodiments, a magnetic holder or pocket holder is used to stow earbud style earphones (or in ear style hearing aids) when not in use. In some such embodiments, each mask strap has a separate magnetic holder, pocket holder, or other type of holder, and the user stows left and right earbuds in the left and right holders when not in use. When the user wants to use the earbuds he or she removes the earbuds from the holders and inserts them in the ears.

Terminology

While certain embodiments of the inventions have been described, these have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A face mask system comprising:
a mask body for covering a portion of a face of a user;
an ear strap attached to the mask body and configured to engage an ear of a user and hold the mask body in front of the mouth of the user; and a hearing aid holder comprising a holding member configured to releasably hold a hearing aid, wherein the holding member of the hearing aid holder comprises a metal element configured to magnetically interact with the hearing aid to hold the hearing aid and face mask system together.

2. The face mask system of claim 1, wherein the metal element comprises a magnet configured to hold the hearing aid by magnetically attaching to a corresponding metal element supported by the hearing aid.

3. The face mask system of claim 2, wherein the metal element of the hearing aid is a metal plate having a thickness of 0.5 mm or less.

4. The face mask system of claim 1, wherein the hearing aid holder is permanently attached to the ear strap and configured to be positioned behind the ear of the user when the ear strap is engaged around the ear of the user.

5. The face mask system of claim 1, wherein the hearing aid holder is configured to be releasably coupled to the ear strap.

6. A face mask system comprising:
a mask body for covering a portion of a face of a user;
an ear strap attached to the mask body and configured to engage an ear of a user and hold the mask body in front of the mouth of the user; and
a hearing aid holder comprising a holding member configured to releasably hold a hearing aid, wherein the hearing aid holder is configured to be releasably coupled to the ear strap and comprises a holder body configured to wrap around the ear strap and detachably attach to itself.

7. The face mask system of claim 6, wherein the hearing aid holder comprises one or magnets configured to detachably attach a portion of the hearing aid holder to another portion of the hearing aid holder, such that the holder body wraps around the ear strap.

8. A face mask system comprising:
a mask body for covering a portion of a face of a user;
an ear strap attached to the mask body and configured to engage an ear of a user and hold the mask body in front of the mouth of the user; and
a hearing aid holder comprising a holding member configured to releasably hold a hearing aid, wherein the hearing aid holder is configured to be releasably coupled to the ear strap and comprises a groove to receive the ear strap and releasably retain the ear strap.

9. A hearing aid holder for a face mask comprising:
a holding member configured to releasably holding a hearing aid,
the hearing aid holder configured to be detachably coupled to an ear loop of the face mask, and wherein the holding member of the hearing aid holder comprises a metal element configured to interact with a corresponding metal element of the hearing aid to magnetically hold the hearing aid.

10. The hearing aid holder of claim 9, wherein the metal element of the holding member is a magnet configured to magnetically attach to a corresponding metal element of the hearing aid.

11. The hearing aid holder of claim 10, wherein the metal element of the hearing aid is a plate having a thickness of 0.5 mm or less.

12. A hearing aid holder for a face mask comprising:
a holding member configured to releasably holding a hearing aid,
the hearing aid holder configured to be detachably coupled to an ear loop of the face mask, and wherein the hearing aid holder comprises a holder body configured to wrap around the ear loop and detachably attach to itself.

13. The hearing aid holder of claim 12, wherein the hearing aid holder comprises one or magnets configured to detachably attach a portion of the hearing aid holder to another portion of the hearing aid holder, such that the holder body wraps around the ear loop.

* * * * *